Fig.1

FRANK J. McDONAL
INVENTOR.

BY D. Carl Richards
AGENT

FRANK J. McDONAL
INVENTOR.

BY D. Carl Richards
AGENT

Fig. 7

FRANK J. McDONAL
INVENTOR.

BY D. Carl Richards
AGENT

June 26, 1956  F. J. McDONAL  2,752,092
WAVE ANALYSIS

Filed Oct. 22, 1951  5 Sheets—Sheet 5

*Frank J. McDonal*
INVENTOR.

BY *D. Carl Richards*
AGENT

United States Patent Office 2,752,092
Patented June 26, 1956

2,752,092
WAVE ANALYSIS

Frank J. McDonal, Dallas, Tex., assignor, by mesne assignments, to Socony Mobil Oil Company, Inc., a corporation of New York Application October 22, 1951, Serial No. 252,561

7 Claims. (Cl. 235—61)

This invention relates to the study of complex waves and more particularly to the measurement of characteristics of frequency components of a given wave and to the utilization of such components.

The invention, in one aspect, relates to the solution of the Fourier integral of the general form:

$$F(t) = \int_0^\infty a(w) \cos wt\, dw + \int_0^\infty b(w) \sin wt\, dw \quad (1)$$

where $$a(w) = \frac{1}{\pi}\int_{-\infty}^{+\infty} F(t) \cos wt\, dt \quad (2)$$

and $$b(w) = \frac{1}{\pi}\int_{-\infty}^{+\infty} F(t) \sin wt\, dt \quad (3)$$

More particularly, there is provided a system for producing scalar indications of the parameters $a(w)$ and/or $b(w)$, by performing the necessary multiplication and integration steps for a predetermined record interval, whereby complex wave forms or portions thereof may be resolved into their respective components.

The invention is particularly useful in studies of the transmission of acoustic waves through a medium such as the earth, as in seismic exploration. In many areas a signal detected by a seismometer or geophone following generation of seismic waves is of such complex nature that little useful information may be derived therefrom.

Many expedients have been adopted for the purpose of improving seismic records. Filtering schemes, phase shifting systems, specific patterns of detectors and their relation to the point of generation of seismic waves and the like have all been utilized in attempts to produce seismograms of greater usefulness.

By the present invention there is provided a system for studying the fundamental nature of complex waves and particularly for studying recorded seismic waves and for that reason the present description will be presented principally from the viewpoint of seismic signal analysis.

In accordance with the present invention there is provided a system for measuring a selected frequency component of a complex wave recorded in phonographically reproducible form. The system includes a reproducing unit for generating a voltage which varies in magnitude in accordance with the complex wave during a scaled time interval related to the original time-duration or the recording interval of said complex wave by a selected scaling factor. The voltage produced is applied in an output circuit to a first contact at a point of intermediate potential and to a second contact movable with respect to the first contact. An integrating circuit having a pair of input terminals, one of which is connected to the first contact and the other connected to the movable contact, is sensitive to the output voltage. The movable contact is driven sinusoidally and symmetrically about the point of intermediate potential at a frequency related to the selected frequency component of the complex wave by the same scaling factor as the reproduction time interval is related to the original time-duration or recording interval to produce a voltage at the input terminals of the integrator proportional to the product of the complex wave and a sinusoidal function of the selected frequency. Means are provided for energizing the integrator during the scaled time interval only to produce an integrated output indicative of the magnitude of the sinusoidal function of the selected frequency component of the complex wave.

In a more specific aspect of the invention a pair of similar output circuits are connected to the reproducing means with the movable contacts associated therewith driven sinusoidally but spaced 90° in phase one from the other. Two integrating circuits responsive to the products of the sinusoidal functions and the reproduced complex wave produce integrated output functions which define the magnitude of the selected frequency component of the complex wave.

In accordance with a further aspect of the invention, there is provided a control system for selectively energizing a circuit element in response to identical pulses generated by a control pulse source. There is provided a multivibrator including two vacuum tubes with a relay coil in the anode-cathode circuit of the first of said tubes and said circuit element in the anode-cathode circuit of the second of said tubes. Each of said tubes has a control pulse input terminal. The input terminal of the first of said tubes is connected to a first normally open circuit interrupter. The input terminal of the second of said tubes is connected to a second normally open circuit interrupter. Third and fourth tubes are provided, each of which has a cathode, an anode, a control grid and a relay coil in its anode-cathode circuit forming a part of a relay means. The relay coil of the third tube controls the first circuit interrupter and the relay coil of the fourth tube controls the second circuit interrupter. The third and fourth tubes, normally conductive, are selectively rendered non-conductive under the control of the relay coil in the anode-cathode circuit of the first tube. Time delay means in the grid-cathode circuits of the third and fourth tubes provides a delay between the de-energization of one of said relay means and the subsequent energization of the other of said relay means controlling said circuit interrupters. A circuit connection is provided between the control pulse source and both of the circuit interrupters for applying said control pulses to said multivibrator to energize and to de-energize the circuit element in response to said control pulses.

For a more complete understanding of the present invention and for further advantages thereof, reference may now be had to the following description taken in conjunction with the accompanying drawings in which.

Figure 1:
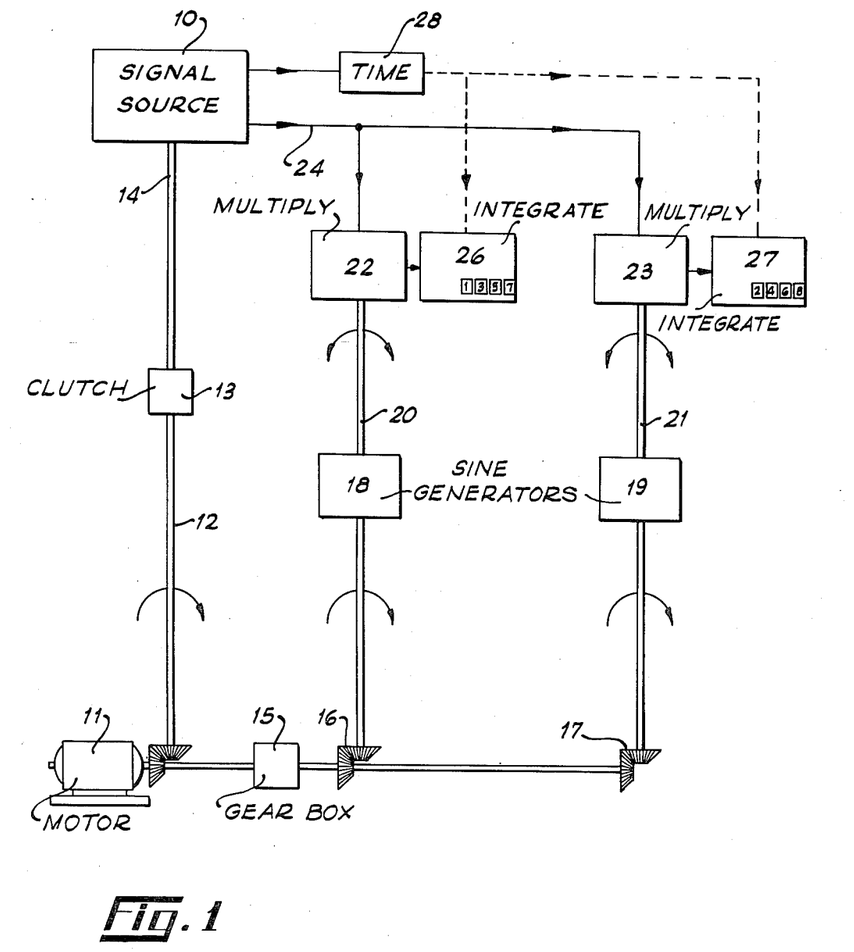
Fig. 1 is a block diagram of a system for determining one frequency component of a complex wave.

Referring now to Fig. 1, there is illustrated a system in which a signal from a source 10 may be analyzed, and whose respective frequency components may be measured. The signal source 10 may be any type of reproducer for translating recorded wave forms that are phonographically reproducible into a voltage which varies as a function of the recorded signal. The Patents 2,463,534 to Hawkins and 2,493,519 to Baltosser are illustrative of such systems.

For signal reproduction, the signal source 10 is driven mechanically from a motor 11 by way of a shaft 12, a clutch mechanism 13, and shaft 14. The motor 11 is also coupled through speed control means such as a gear box 15 and the two pairs of bevel gears 16 and 17 to sinusoidal motion generators 18 and 19, respectively. A sinusoidal motion is transmitted by way of shafts 20 and 21 to multiplying devices 22 and 23. The output signal from source 10 is applied to the multipliers 22 and 23 by way of channel 24.

The voltage output of the multipliers 22 and 23 is the product of the varying voltage on channel 24 and the motion of the shafts 20 and 21. The output voltages are applied to integrators 26 and 27. A timing signal generated by the signal source 10 is translated by the unit 28 into an actuating effect which is applied to the integrators 26 and 27. The output of the device 28 initiates or energizes the integrators 26 and 27 so that they sum the outputs of the multipliers 22 and 23 for a selected time interval.

As will hereinafter be explained, the sinusoidal motion generators 18 and 19 are driven in quadrature phase relation so that the integrated output of, for example, the multiplier 22 satisfies Equation 2 and the integrated output of multiplier 23 satisfies Equation 3. With the foregoing quantities determined, the Fourier integral expressed in Equation 1 may be solved.

In accordance with the present invention, the integrators 26 and 27 will produce an indicia of the quantities $a(w)$ and $b(w)$ for one frequency. The particular frequency depends upon the number of cycles shafts 20 and 21 rotate in a time interval corresponding with a selected segment of the record translated by source 10. If the mechanical drive to the source 10 is maintained at a constant scaled rate with respect to the rate at which original record was made, the output from the gear box 15 may be varied from one analyzing run to another to produce a plurality of values for the Fourier transforms $a(w)$ and $b(w)$ corresponding to different selected frequency components thereof.

Although there is a definite time interval in which the original events recorded on a seismic record actually occurred, the analysis need not be restricted by such time interval. In the present invention it is convenient to take advantage of this fact and to carry out the analysis of the seismic record in a time interval differing from the original time interval. For example, seismograms, generally shorter, but sometimes four or five seconds or more long, may be reproduced for analysis by the device 10, Fig. 2, in intervals of minutes or more if such is desired or required to meet the accuracy requirements. Thus in the following discussion reference will be made to a scaled time interval in which an appropriate scaling factor relates frequencies and time to the actual physical conditions characteristic of the original event.

Figure 2:
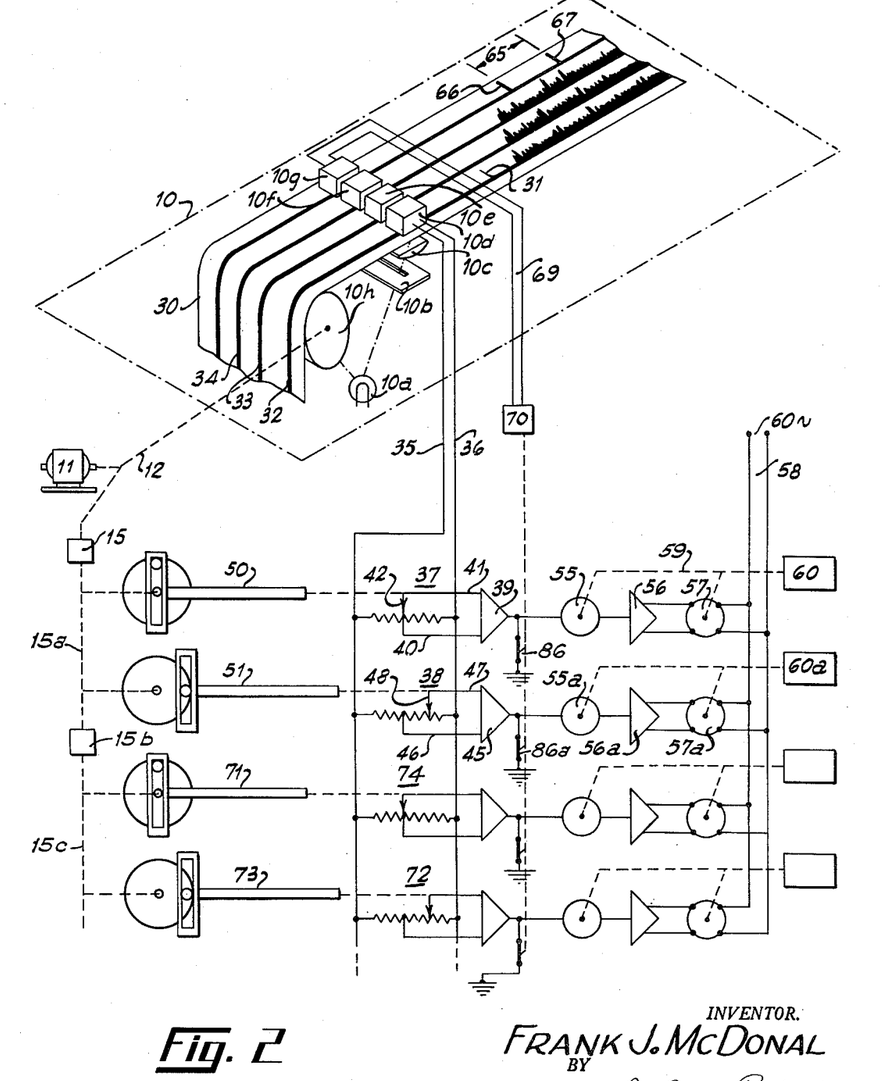
Fig. 2 schematically illustrates the operation of the system of Fig. 1.

Referring now to the more detailed Fig. 2, the signal source or reproducer 10 includes a light source 10a which projects a beam of light through a slotted plate 10b and condensing lens 10c onto light sensitive detecting elements 10d, 10e, 10f and 10g. A phonographically reproducible record 30, illustrated as a variable area recording on a photographic film negative, of a plurality of traces 32—34, is driven between the condensing lens 10c and the light sensitive devices 10d–f at a constant speed by a driving roller 10h. The mechanical coupling between the constant speed motor 11 and the roller 10h of the signal reproducer 10 is represented by the dotted line 12.

The signals recorded on film 30 as variable area traces correspond to the several traces of a seismic record produced upon detonation of an explosive charge at a zero record time corresponding with a time break pulse 31 recorded on trace 32. The variations in amplitude following the time break 31 correspond with the output of a seismometer or seismometers. In accordance with the present invention, a varying voltage is produced by a light sensitive device 10d, such as a photo-electric detector cell, the voltage varying in accordance with variations in the trace 32. Preferably, the roller 10h is driven at a relatively slow speed so that the output of detector 10d is a slowly varying unidirectional voltage, the variations corresponding with the trace 32. Thus in this system the reproduction and the analysis steps hereinafter described are performed in a scaled time interval that is very much longer than the original seismic event. Suitable scaling factors in the order of several hundred have been found to be satisfactory.

The output voltage from the detector 10d appears on conductors 35 and 36 which are connected to the extremities of each of a pair of linear slide wire potentiometers 37 and 38. An output voltage from potentiometer 37 is applied to an amplifier 39 by way of a conductor 40, connected to a fixed center tap on the potentiometer 37 and a second conductor 41 connected to a movable tap 42. Similarly, an output signal for the potentiometer 38 is applied to amplifier 45 by way of a first conductor 46 connected to a fixed center tap on the potentiometer 38 and a second conductor 47 connected to a movable tap 48 on potentiometer 38. Tap 42 is driven mechanically by a Scotch yoke device 50 to transform the rotational motion from gear box 15 into linear sinusoidally varying motion. Similarly, the movable tap 48 is driven by a similar Scotch yoke 51. Scotch yokes 50 and 51 are actuated 90° out-of-phase so that when the movable tap 42 is at the center of the potentiometer 37 the movable tap 48 is at the extreme end of its stroke on the potentiometer 38. The voltage appearing between the fixed center tap, conductor 40, and the movable tap 42 varies sinusoidally about a point of zero potential determined by the point of connection of the conductor 40 to the potentiometer resistor.

Figures 2A, 4:
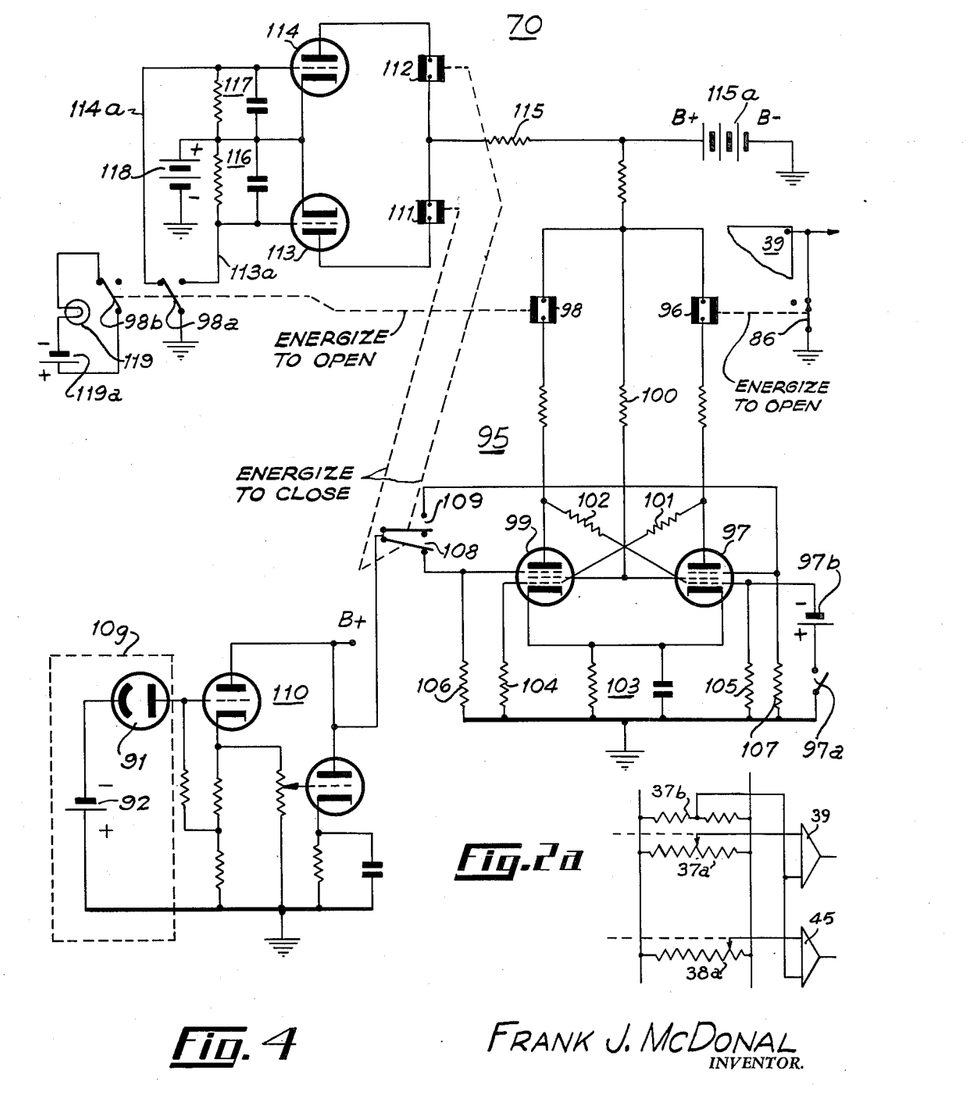
Fig. 2a is a schematic diagram of an alternative form of the multiplying network.
Fig. 4 is a schematic diagram of the timing system of Figs. 1 and 2.

In Fig. 2a there is illustrated an alternative multiplying network in which movable taps on potentiometers 37a and 38a are driven sinusoidally 90° spaced apart in phase. A center tapped impedance 37b is connected in parallel with the potentiometers 37a and 38a, the center tapped point being connected to the input of both of the amplifiers 39 and 45. In this system although the movable taps are associated with different resistors, they are driven sinusoidally about a point having the same potential as the mid-point of the resistor 37b. The result is the same as in Fig. 2.

The voltage applied to amplifier 39 is the product of the seismic signal voltage produced by detector 10d and the values of the sine as produced by the sine motion generated by the Scotch yoke device 50, the sine motion having the frequency of the output of the gear box 15. Similarly, the voltage applied to the input of amplifier 45 is the product of the seismic signal, the output voltage from detector 10d, and values of the cosine as produced by the cosine motion generated by the Scotch yoke device 51. Devices 50 and 51, coupled to the same driving shaft 15a, have the same frequency. Amplifiers 45 and 39 are then coupled, as hereinafter described, to integrating devices for the production of numerical indications of the factors $a(w)$ and $b(w)$, the solutions to Equations 2 and 3.

The integrator circuits are identical in construction. While one of the integrators is shown in detail in Fig. 3, a schematic showing is included in Fig. 2. The integrator connected to the output of amplifier 39 comprises a tachometer generator 55 whose output is applied to a high gain amplifier 56. Amplifier 56 feeds one phase of a two-phase motor 57. The second phase of the motor 57 is supplied from a suitable alternating current supply circuit 58.

The record controlled varying D. C. output voltage from amplifier 39 is converted to alternating current in the amplifier 56 (by means shown in Fig. 3) so that the rotation of the motor 57 is directly proportional to the output of amplifier 56. Motor 57 is mechanically connected by way of a shaft represented by the dotted line 59 to the tachometer generator 55 and additionally to a mechanical counter 60. The motor 57 drives the tachometer generator 55 to produce a D. C. voltage at the input of amplifier 56 opposite in sense to the output of the amplifier 39. The operation of the system is such that the number of revolutions made by shaft 59 is directly proportional to the integral of the output of amplifier 39, the extent of rotational motion of shaft 59 being sensed by a counter 60.

An integrating device identical in construction and operation with that above briefly described is connected to the output circuit of amplifier 45 and includes tachometer generator 55a, amplifier 56a and motor 57a for actuation of a counter 60a.

Figure 3:
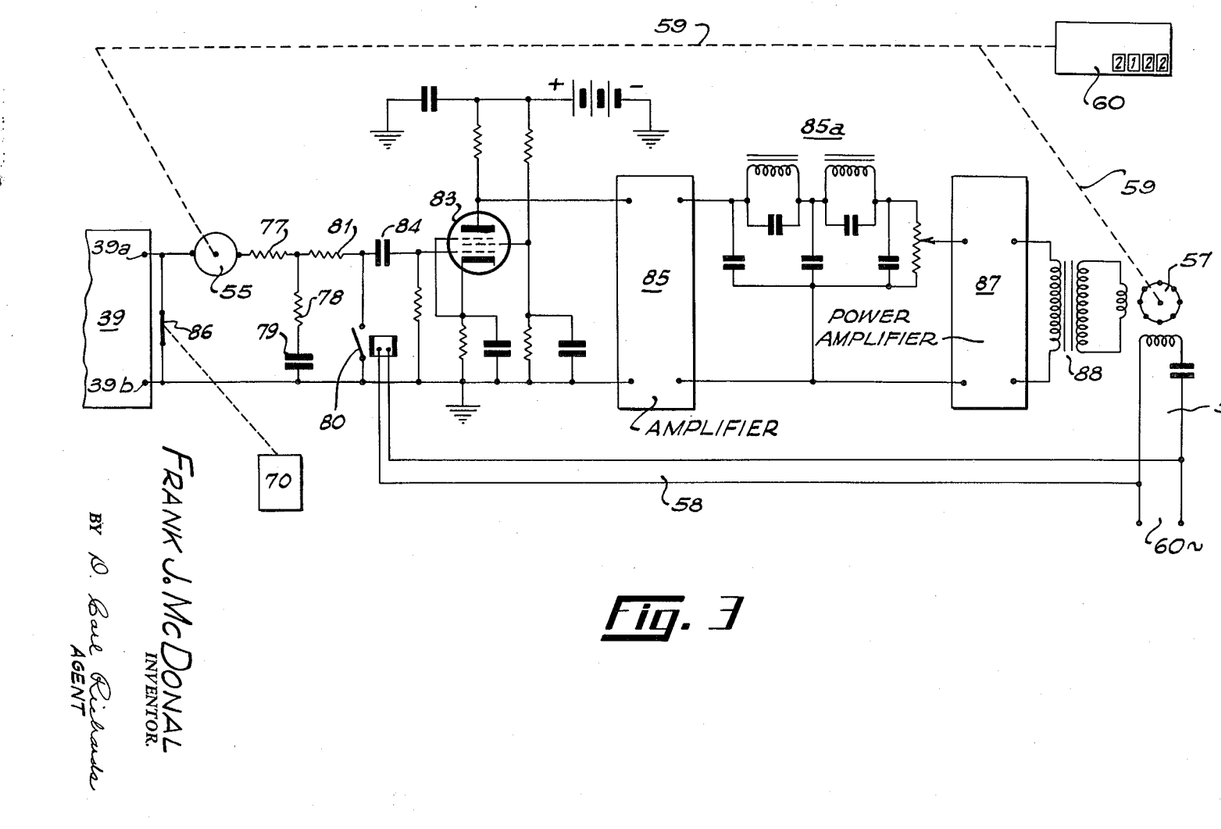
Fig. 3 is a schematic diagram of one of the integrators of Figs. 1 and 2.

Each of the integrating circuits previously described may be like the one illustrated in Fig. 3. The output of one of the amplifiers, for example the amplifier 39, is applied to the integrator input terminals. More specifically, the terminal 39a is connected directly to a first output terminal of the D. C. tachometer generator 55. The second output terminal of generator 55 is connected by way of resistors 77 and 78, and condenser 79 to the second output terminal 39b of amplifier 39. The generator 55 is poled so that its output opposes the output of amplifier 39. As a result the algebraic sum of the generator voltage and the amplifier voltage is applied to a convertor or chopper 80 by way of a resistor 81. The chopper 80, polarized, is driven from the 60-cycle source connected to circuit 58 so that the input to the first amplifying tube 83 comprises pulses repeated at the rate of 60-per-second. The amplitude of the pulses at any instant is equal to the difference between the voltage from generator 55 and the voltage from amplifier 39. The 60-cycle pulses are applied to the tube 83 by way of condenser 84. The amplifier stage, including tube 83, is a conventional pentode stage whose output may be applied to additional amplifying stages included in the amplifier 85.

The output of amplifier 85 is applied to a filter system 85a which passes only the 60-cycle component of the output of amplifier 85. The output of filter 85a is applied to a power amplifier 87 whose output in turn is applied by way of transformer 88 to one phase of the two phase motor 57. The second phase of motor 57 is also energized from the supply lines 58 from the same 60-cycle source that drives the vibrator 80. The mechanical coupling 59, a rotatable shaft, interconnects the motor 57 and the generator 55 so that in effect the system is a high gain negative feedback electro-mechanical amplifier. The revolution counter 60 is driven from shaft 59 in direct proportion to the feedback voltage. The amplifier 85 is provided with high gain so that the reading on counter 60 is directly proportional to the integral of the output of amplifier 39. When the voltage from amplifier 39 is relatively high, the tachometer generator 55 must be driven at a relatively high speed in order to produce a compensating voltage that is substantially equal in amplitude but of polarity opposite to the output of amplifier 39. If the amplifier output voltage is zero, voltage generated by tachometer generator 55 may be zero and shaft 59 will not rotate.

As indicated in Fig. 2 it is not necessary, nor desirable in some instances, to conduct an analysis of all of the energy recorded on the trace 32. Rather the analysis may be limited to selected portions of the record such as that portion between markers 66 and 67. There is provided an analyzing system responsive only to the energy in a selected portion of the record and more particularly to a system in which the switch 86 of Fig. 3 is controlled in response to such timing markers as markers 66 and 67.

Switch 86, normally closed, is connected across the output of amplifier 39. When switch 86 is closed, the integrator is de-energized and when switch 86 is open, the integrator is responsive to the output of amplifier 39. Further details of the control system, a timing system, are illustraed in Fig. 4.

The signal generator device including the detector 10g and forming a control pulse source has been included with the switching system in Fig. 4 since the switching system is responsive to voltage pulses generated thereby. The detector 10g may include a photo cell 91 connected in series with a battery 92 and an output circuit which includes the input grid-cathode circuit of a vacuum tube amplifier 110. Variations in light impinging upon the photo tube 91 produce voltage pulses in time coincidence with the passage of markers 66 and 67 between the light source and the photo tube 91. In the condition of the timing device 70 illustrated in Fig. 4, the switch 86 is maintained in a closed circuit position, shorting the output of amplifier 39. When marker 66 produces a voltage pulse at the input of amplifier 110, switch 86 is opened and remains open until a second pulse is applied to amplifier 110 whereupon switch 86 is closed. More particularly, the switching system includes a bistable multivibrator 95 which has a first relay coil 98 connected in the plate or anode-cathode circuit of a first tube 99 and a circuit element shown as a second relay coil 96 connected in the plate circuit of a second tube 97. The tubes 97 and 99 are conventional pentodes having their screens connected directly together and to B+ by way of resistor 100. The control grids are cross-connected to the anodes through resistors 101 and 102. The cathodes are directly connected together and to ground by way of resistor-condenser combination 103. The control grids are connected to ground by way of resistors 104 and 105. The suppressor grids are connected to ground through resistors 106 and 107. Additionally, the suppressor grids are connected to contacts of circuit interrupters shown as relay switches 108 and 109.

The signals from the source including detector 10g are applied by way of an amplifier 110 to the movable contacts associated with the switches 108 and 109. The contact arm of switch 108 is actuated by a relay coil 111 and the arm of switch 109 is actuated by a relay coil 112. The relay coils 111 and 112 are in the plate circuits of tubes 113 and 114, respectively. The point intermediate output relay coils 111 and 112 is connected by way of resistor 115 to the B+ terminal of a suitable B-supply source such as battery 115a.

The grid-cathode circuit of tube 113 includes a resistor-condenser combination 116. The grid-cathode circuit of tube 114 includes a similar resistor-capacitor combination 117. The cathodes of tubes 113 and 114 are connected by way of a battery 118 to ground. The control grid of tube 114 is connected by way of conductor 114a to one terminal of switch 98a. Similarly, the control grid of tube 113 is connected by way of conductor 113a to a second terminal of the switch 98a. The control grids of tubes 113 and 114 are selectively grounded under the control of the relay coil 98 which is mechanically or magnetically coupled to switches 98a and 98b. The switch 98a is illustrated in its energized position. Upon de-energization of relay 98 the armature of switch 98a is moved from a first position in which the grid of tube 114 is grounded to a second position in which the grid of tube 113 is grounded. As illustrated, the grid of tube 114 is grounded so that battery 118 biases the grid of tube 114 beyond cutoff and no current flows through relay coil 112. When such is the case the operating coil 112 of switch 109 in the input of multivibrator 95 is not energized, i. e. switch 109 is in an open circuit position. Since the grid of tube 113 is connected to cathode by way of the R-C circuit 116 only, the grid and cathode are at substantially the same potential, permitting anode current flow through the relay coil 111. Energization of relay coil 111 closes and maintains closed the switch 108.

In the latter condition the system of Fig. 4 is ready to receive a first signal from the pulse source including detector 10g. A first pulse generated by that source in response to the passage of marker 66 through the light beam of Fig. 2, is applied through switch 108 to the suppressor grid of tube 99 to extinguish or to render the tube non-conductive. Immediately the tube 97 begins to conduct which energizes the relay coil 96 to open switch 86 permitting application of signals from amplifier 39 to the integrator. At the same time current ceases to flow in the relay coil 98 permitting the armature of switch 98a to connect the grid of tube 113 to ground. Immediately the tube 113 ceases to conduct and the relay coil 111 is de-energized permitting switch 108 to move to its normally open position.

The resistor-condenser combination 117, a delay network, controls the interval between the actuation of the switch 98a and the energization of the relay coil 112. The time delay prevents closure of switch 109 for an interval that is preferably longer than is required for the generation of an electrical pulse by the passage of the marker 66 through the light beam from the source 10a of Fig. 2. It will be appreciated that the speed at which the film 30 is propelled past the detecting elements 10d–g may vary from one record to another depending upon the frequencies of interest and the type of record under consideration. If marker 66 were to travel very slowly past the light beam from source 10a and relay coils 111 and 112 were permitted to be deenergized or energized respectively simultaneously the pulse from marker 66 could be applied to the tube 97 through switch 109. This would close switch 86. Without the time delay afforded by the R-C combinations 116 and 117 positive control of switch 86 would not be possible for all record analyzing speeds.

Accordingly when the armature of switch 98a is moved from its illustrated first position to its second position the tube 113 is made non-conductive so that the relay coil 111 is immediately de-energized to open switch 108. Thereafter, depending upon the time delay in the R-C circuit 117, switch 109 is closed by the conduction of tube 114. The circuit remains in the latter condition until marker 67 of Fig. 2 interrupts the light beam whereupon the source including the detector 10g produces a second voltage pulse which is transmitted from the output of detector 10g through switch 109 to the suppressor grid of tube 97. Immediately tube 97 is extinguished to close switch 86 which shorts the output of amplifier 39. At the same time, tube 99 begins to conduct whereupon relay coil 98 actuates the armature of switch 98a to connect the grid of tube 114 to the negative terminal of the battery 118. The relay coil 112 is thereupon de-energized to open switch 109. After a suitable time interval determined by the time constant of the R-C network 116, the tube 113 begins to conduct, energizing relay coil 111 to close switch 108. The circuit is now back in its initial or standby condition of operation and ready for application of a succeeding pulse at the beginning of another analyzing interval.

In the interval that the switch 86 is open there is produced an indication on the counter 60, Fig. 2, that is directly proportional to the function $a(w)$ of the Equation 2. Similarly, switch 86a, Fig. 2, is open in the same interval, being actuated by the device 70, similarly to produce an indication on the counter 60a, the latter being directly proportional to the function $b(w)$ of Equation 3. The two readings from counters 60 and 60a may then be utilized to determine the absolute magnitude of a first frequency component of the recorded signal. This component has a frequency which is the scaled frequency of the operation of the sine and cosine motion generating devices 50 and 51.

A second point may thereafter be obtained by changing the frequency of operation of devices 50 and 51 with respect to the rate of reproduction of the trace 32 and repeating the multiplication and integration as above described.

It will be recalled that the square root of the sum of the squares of the readings from counters 60 and 60a is the absolute magnitude of the component of the selected frequency. By selecting a plurality of points through the frequency spectrum a substantially continuous amplitude-frequency curve may be produced.

Alternatively, and as illustrated in Fig. 2, a plurality of pairs of Scotch yoke devices and associated integrating circuits are operated in synchronism with Scotch yokes 50 and 51 simultaneously to produce indications for several selected frequencies. For example, the Scotch yokes 71 and 73 drive movable taps on potentiometers 74 and 72 respectively. The latter potentiometers are connected in parallel to potentiometers 37 and 38. A second gear box 15b couples shaft 15a to shaft 15c, the gear box being adjusted for a selected frequency of operation of the Scotch yokes 71 and 73 relative to yokes 50 and 51. Additional pairs of channels may be coupled to the system.

Referring again to Fig. 4, it will be remembered that in standby condition, the switch 108 must be closed and switch 109 open. This requies that tube 97 in the multivibrator 95 must be non-conducting and tube 99 conducting. In this condition, the switches 98a and 98b are in their left hand or "open" position. Switch 86 is in its "closed" or right hand position. In order to make certain that such is the case and to make proper adjustments if this condition does not exist, there is provided indicating means such as the pilot light 119 connected in circuit with a battery 119a and the second switch 98b. When pilot light 119 is energized there is a positive indication that the system is in standby condition. If pilot light 119 is not energized, then tube 97 may be triggered to establish the desired condition. More particularly, the control grid of tube 97, in addition to having a ground connection by way of resistor 105, is connected to the negative terminal of a biasing battery 97b whose positive terminal is connected to a normally open single-pole single-throw switch 97a. Switch 97a when closed completes a circuit to the control grid of tube 97, applying the voltage of battery 97b thereto to de-energize tube 97 and energize tube 99. When tube 97 is non-conducting, switch 86 is closed and the integrating channel associated therewith is de-energized.

Figure 5:
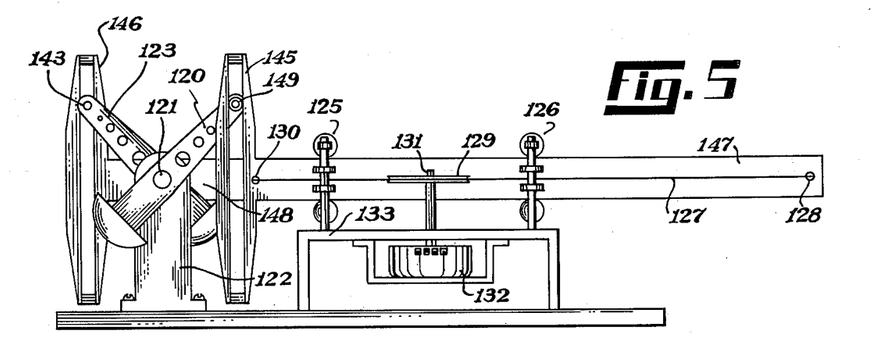
Fig. 5 is an elevation view of a suitable multiplying device.
Figure 6:
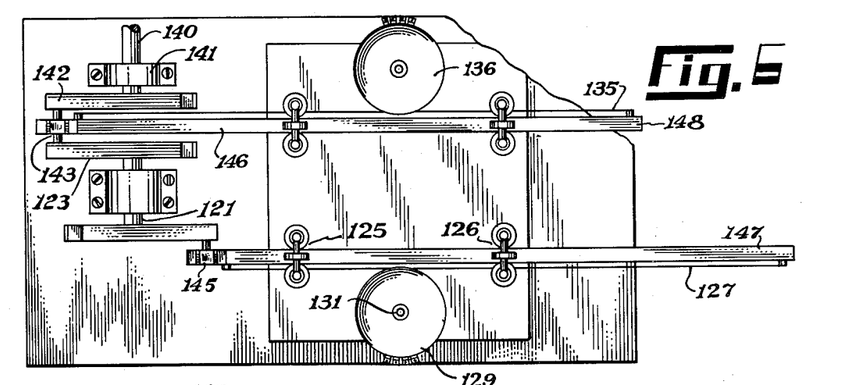
Fig. 6 is a plan view of the multiplying device of Fig. 5.
Figure 7:
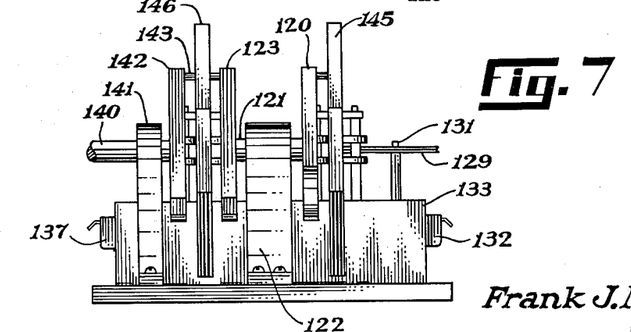
Fig. 7 is an end view of the multiplying device of Fig. 5.

Figs. 5, 6 and 7 illustrate in greater detail than in Fig. 2 the sine motion generating system. Referring first to the elevation view of Fig. 5, a pair of yoke members 145 and 146, conforming in shape to that of a T-square are positioned with their central extensions 147 and 148 horizontal and are supported for linear motion along a horizontal line. The head portions of the Scotch yokes are slotted to accommodate rollers, only one of which, the roller 149 is shown in Fig. 5. Roller 149 is carried at the end of a first crank arm 120 which in turn is actuated from a crank shaft 121. Shaft 121 is supported by a standard 122. Upon rotation of the crank arm 120 about shaft 121, the Scotch yoke 145 moves horizontally with sinusoidal motion. A second crank arm 123 actuates in similar manner the Scotch yoke device 146. The center extension 147 of the Scotch yoke 145 is mounted on ball bearing supports 125 and 126. Each of the latter supports includes six ball bearings, two co-acting with each vertical face and one co-acting with each horizontal face of the extension 147. The bearing devices are adjusted to prevent mechanical play so that motion of the Scotch yoke device is limited to absolutely linear motion. A cable 127 is fastened at the right end of the extension 147 in a suitable anchor such as stud 128. Cable 127 is then threaded around a pulley 129 and is anchored at a second stud 130. The sinusoidal linear motion of the Scotch yoke 145 is thus translated into sinusoidal rotational motion as sensed by the pulley 129. A pulley shaft 131 extends in a coupled relation to an actuating arm of a potentiometer 132 suitably supported from a frame member 133. It will be apparent that the Scotch yoke device 145 and the potentiometer 132 are the counterparts of Scotch yoke 50 and potentiometer 37 of Fig. 2. As illustrated in Fig. 6, a second cable 135 encircling a second pulley 136 and controlled by the Scotch yoke device 146 translates the linear sinusoidal motion of the Scotch yoke 146 into rotational sinusoidal motion for actuating a second potentiometer, the counterpart of potentiometer 38, Fig. 2. The Scotch yoke devices 145 and 146 are identical in construction and in operation except that the crank arms 120 and 123 are oriented in a 90° space displacement so that the output voltage from potentiometer 132 and its companion potentiometer 137 (shown only in Fig. 7) have a 90° phase displacement.

As shown in Figs. 6 and 7, rotational motion applied to the input shaft 140, journaled in a support 141, drives crank arm 142. A shaft 143 extends from the crank arm 142 through the slotted portion of the Scotch yoke 146 and is coupled to the second crank arm 123. Crank arm 123 transmits rotational motion through its supporting shaft 121 through standard 122 to the crank arm 120. By thus interconnecting the system it is assured that the Scotch yoke devices 145 and 146 are actuated in quadrature phase.

With a system such as illustrated in Figs. 5–7, the motion may be carefully controlled for the production of low frequency sinusoidal voltages of reliable character. Each component of motion is transmitted through carefully machined and fitted bearing surfaces so that vibrations do not alter the character of output voltages. The cables 127 and 135 are disposed on a line tangent to the pulley wheels 129 and 136, respectively. Crank arms 121, 123 and 142 are counter-balanced to prevent accelerations due to gravity. Potentiometers 132 and 137 preferably are precision wound linear resistors of substantial radius. Such a system is preferred over systems which include potentiometers driven with constant rotational motion, the potentiometers themselves being provided with windings that have a sinusoidal variation in resistance with angular displacement of a contacting arm. It has been found that accuracies to within two-tenths of one per cent may be readily obtained with a system here described, whereas considerably less accuracy is available in other types of systems. Combining such a sine motion generating device with a signal reproducer of high quality permits an over-all accuracy in the analysis procedures superior to other systems known in the art.

The foregoing circuit elements and the sine motion generating devices above described in detail while suitable for one embodiment of the invention are to be taken as suggestive and not as limiting the invention. Other specific circuits and devices will be selected in accordance with particular requirements of similar devices to be constructed in accordance with the present invention and, while the particular embodiments have been illustrated and described, it will be understood that further modifications may be added. It is therefore intended to cover such modifications as fall within the scope of the appended claims.

What is claimed is:

1. A system for measuring a selected frequency component of a preselected segment of a complex wave recorded in phonographically reproducible form together with a first marker at the beginning and a second marker at the end of said preselected segment of said recorded wave which comprises means for reproducing said wave as a unidirectional voltage which varies in magnitude in accordance with said complex wave during a scaled time interval related to the original time-duration of said preselected segment of said complex wave by a scaling factor, a pair of output circuits connected to said reproducing means, the first of said output circuits including means for multiplying said voltage by a sine function and the second of said circuits including means for multiplying said voltage by a cosine function, the frequency of said functions being related to said selected frequency component by said scaling factor, integrating circuits in each of said output circuits responsive to the products of said voltage and said sine function and said cosine function respectively, switching means in said output circuits normally short-circuiting said unidirectional voltage, a bistable multivibrator having a coil coupled to said switching means, a detecting circuit connected to said multivibrator and responsive to the first of said markers for actuating said multivibrator and said coil to open said switching means coincident with the beginning of said segment, and circuit means responsive to the second of said markers for actuating said multivibrator to de-energize said coil and close said switching means at the end of said segment thereby to limit the response of said integrating circuits to said preselected segment of said complex wave.

2. A system for measuring a selected frequency component of a preselected segment of a complex wave recorded in phonographically reproducible form together with a first marker at the beginning and a second marker at the end of said preselected segment of said recorded wave which comprises means for producing a first signal comprising a voltage which varies in magnitude in accordance with said complex wave during a scaled time interval related to the original time-duration of said selected segment of said complex wave by a scaling factor, an output circuit including means for multiplying said first signal by a sine function whose frequency is related to said selected frequency component by said scaling factor, a shorting circuit connected across said output circuit, means for producing a second signal from said first marker at the beginning of said preselected segment, control means responsive to said second signal for opening said shorting circuit, a circuit connected to said output circuit for integrating said multiplied voltage when said shorting circuit is open, and means for producing a third signal from said second marker for closing said shorting circuit in time-coincidence with the end of said preselected segment.

3. A control system for selectively energizing a circuit element in response to a control voltage generated by a control source which comprises a multivibrator including two vacuum tubes with a relay coil in the anode-cathode circuit of the first of said tubes and said circuit element in the anode-cathode circuit of the second of said tubes and each of said tubes having a control voltage input terminal, a first normally open circuit interrupter connected to the voltage input terminal of the first of said tubes, a second normally open circuit interrupter connected to the voltage input terminal of the second of said tubes, means responsive to energization and deenergization of said relay coil for opening closing said first and said second circuit interrupters respectively including time delay means having a period greater than the period of generation of said control voltage.

4. A control system for selectively energizing a circuit element in response to identical pulses generated by a control pulse source which comprises a multivibrator including two vacuum tubes with a relay coil in the anode-cathode circuit of a first of said tubes and said circuit element in the anode-cathode circuit of a second of said tubes and each of said tubes having a control pulse input terminal, a first normally open circuit interrupter connected to said pulse input terminal of the first of said tubes, a second normally open circuit interrupter connected to said pulse input terminal of the second of said tubes, a third and fourth tube each of which has a cathode, an anode, a control grid and a relay coil in its anode-cathode circuit, an actuating coupling between said relay coil of said third tube and said first circuit interrupter, an actuating coupling between said relay coil of said fourth tube and said second circuit interrupter, a switch having an armature which in a first position is connected to said control grid of said fourth tube and in its second position is connected to said control grid of said third tube, biasing means connected between said armature of said switch and the cathodes of said third and fourth tubes for maintaining said fourth tube non-conductive when said armature is in said first position and for maintaining said third tube non-conductive when said armature is in said second position, said third tube being conductive when said armature is in its first position to energize the relay coil of said third tube for closing the first of said circuit interrupters, and a circuit interconnecting said pulse source and both of said circuit interrupters for transmission of a first control pulse to said first tube for initiating a series of circuit changes which include (1) rendering said first tube non-conductive and said second tube conductive thereby to energize said element, (2) de-energizing said relay coil of said first tube for movement of said armature to its second position thereby to transfer said biasing means from said fourth tube to said third tube, and (3) respectively de-energizing and energizing said relay coils in said anode-cathode circuits of said third and fourth tubes respectively to open said first circuit interrupter and to close said second circuit interrupter for application of a second control pulse to said second tube.

5. A control system for selectively energizing a circuit element in response to identical pulses generated by a control pulse source which comprises a multivibrator including two vacuum tubes with a relay coil in the anode-cathode circuit of a first of said tubes and said circuit element in the anode-cathode circuit of a second of said tubes and each of said tubes having a control pulse input terminal, a first normally open circuit interrupter connected to said pulse input terminal of the first of said tubes, a second normally open circuit interrupter connected to said pulse input terminal of the second of said tubes, a third and fourth tube each of which has a cathode, an anode, a control grid and a relay coil in its anode-cathode circuit, an actuating coupling between said relay coil of said third tube and said first circuit interrupter, an actuating coupling between said relay coil of said fourth tube and said second circuit interrupter, a switch having an armature which in a first position is connected to said control grid of said fourth tube and in its second position is connected to said control grid of said third tube, biasing means connected between said armature of said switch and the cathodes of said third and fourth tubes for maintaining said fourth tube non-conductive when said armature is in said first position and for maintaining said third tube non-conductive when said armature is in said second position, time delay means in the grid cathode circuits of both of said third and fourth tubes thereby to delay energization of the relay coils of said third and fourth tubes and thus to delay the closing respectively of said first and second circuit interrupters for a time interval determined by the time constant of said time delay means, and a circuit interconnecting said pulse source and both of said circuit interrupters for transmission of a first control pulse to said first tube for initiating a series of circuit changes which include (1) rendering said first tube non-conductive and said second tube conductive thereby to energize said element, (2) de-energizing said relay coil of said first tube for movement of said armature to its second position thereby to transfer said biasing means from said fourth tube to said third tube, and (3) respectively de-energizing and energizing said relay coils in said anode-cathode circuits of said third and fourth tubes respectively to open said first circuit interrupter and to close said second circuit interrupter after said time interval determined by the time constant of said time delay means for application of a second control pulse to said second tube.

6. A system of measuring a selected frequency component of a complex wave, comprising means for driving along a predetermined path a phonographically reproducible record of said complex wave, means including a reproducer disposed adjacent said path of said record of said complex wave for generating a voltage which varies in magnitude in accordance with said wave, a resistor having a movable contact, connections for applying said generated voltage across said resistor, an amplifier having an output circuit and having an input circuit connected to said resistor by way of said movable contact, means for driving said movable contact along said resistor in accordance with a sine function to apply to said input circuit a signal representative of the product of instantaneous values of said complex wave and of said sine function, a generator connected in said output circuit for opposing the output thereof, amplifying means including a converter for producing an alternating current output, a motor energized in accordance with said alternating current output for driving said generator, the speed of said generator being representative of instantaneous values of output of said amplifier and the rotation thereof being representative of the integrated output of said amplifier, means for recording said rotation of said generator as the integrated output of said amplifier, said reproducible record including markers displaced one from the other to define therebetween a fractional part of said complex wave as appearing on said record, a second reproducer disposed adjacent said path of said record for producing a control signal in response to passage by it of each of said markers, control means effective in one position for preventing the recording of the integrated output of said amplifier and operable to a second position for the recording of the integrated output of said amplifier, and actuating means for said control means responsive to the signal produced by said first marker for operating said control means for recording the integrated output of said amplifier during passage of said record through a distance equal to the separation distance between said markers and operable in response to the signal produced by said second marker for operating said control means to its initial position to prevent said recording during passage of the remainder of said record relative to said first reproducer.

7. A system of measuring a selected frequency component of a complex wave, comprising means for driving a phonographically reproducible record of said complex wave along a predetermined path, means including a reproducer disposed adjacent said path of said record of said complex wave for generating a voltage which varies in magnitude in accordance with said wave, a resistor having a movable contact, connections for applying said generated voltage across said resistor, an amplifier having an output circuit and having an input circuit one side of which is connected to a point intermediate the ends of said resistor and the other side of which is connected to said movable contact, means driven in constant timed relation with said first-named driving means for driving said movable contact along said resistor in accordance with a sine function between positions on opposite sides of and equidistant from said point of connection, a switch connected across the output circuit of said amplifier normally short-circuiting the same, said reproducible record including a pair of markers displaced one from the other between initial and final limits between which said complex wave is recorded, a second reproducer disposed adjacent said path of said record for generating a voltage in response to each of said markers, means for operating said switch in response to generation of said voltage due to said first marker for opening said switch and in response to generation of said voltage by said second marker for closing said switch, a generator connected in said output circuit developing therein a voltage with a polarity opposing the output voltage of said amplifier, amplifying means including a converter for producing from the difference voltage of said output circuit an alternating current output, a motor energized in accordance with said alternating current output for driving said generator, the speed of said generator being representative of instantaneous values of output of said amplifier and the extent of rotation being representative of the integrated output of said amplifier, and means for recording said integrated output of said amplifier.

References Cited in the file of this patent

UNITED STATES PATENTS

| | | |
|---|---|---|
| 1,559,325 | Jewett | Oct. 27, 1925 |
| 2,212,799 | Sperry | Aug. 27, 1940 |
| 2,513,537 | Williams | July 4, 1950 |
| 2,564,500 | Poole | Aug. 14, 1951 |
| 2,574,373 | Bivens | Nov. 6, 1951 |
| 2,622,798 | Aughtie | Dec. 23, 1922 |

OTHER REFERENCES

"A New Fourier Coefficient Harmonic Analyzer," S. Charp; A. I. E. E. Technical Paper 49–163; May 1949.